(12) United States Patent
Yan

(10) Patent No.: US 11,733,855 B2
(45) Date of Patent: Aug. 22, 2023

(54) APPLICATION IDENTIFIER DISPLAY METHOD AND TERMINAL DEVICE

(71) Applicant: VIVO MOBILE COMMUNICATION CO., LTD., Guangdong (CN)

(72) Inventor: Chao Yan, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 0 days.

(21) Appl. No.: 17/472,231

(22) Filed: Sep. 10, 2021

(65) Prior Publication Data

US 2021/0405861 A1    Dec. 30, 2021

Related U.S. Application Data

(63) Continuation of application No. PCT/CN2020/075385, filed on Feb. 14, 2020.

(30) Foreign Application Priority Data

Mar. 11, 2019    (CN) .......................... 201910181315.3

(51) Int. Cl.
*G06F 3/04855* (2022.01)
*G06F 9/451* (2018.01)
(Continued)

(52) U.S. Cl.
CPC ........ *G06F 3/04855* (2013.01); *G06F 3/0482* (2013.01); *G06F 3/04847* (2013.01); *G06F 9/451* (2018.02); *G06F 3/04817* (2013.01)

(58) Field of Classification Search
CPC ............... G06F 3/04855; G06F 3/0482; G06F 3/04817; G06F 3/451
See application file for complete search history.

(56) References Cited

U.S. PATENT DOCUMENTS 8,769,431 B1 * 7/2014 Prasad .................. G06F 3/0488
                                                                    715/764
9,798,443 B1 * 10/2017 Gray .................. G06F 3/04817
(Continued)

FOREIGN PATENT DOCUMENTS

CA       3040356 A1 *  4/2018   .......... G06F 3/0481
CN       103677567 A      3/2014
(Continued)

OTHER PUBLICATIONS

International Search Report of International Application No. PCT/CN2020/05385 dated May 20, 2020.
(Continued)

*Primary Examiner* — Tadesse Hailu
(74) *Attorney, Agent, or Firm* — IP & T Group LLP

(57) ABSTRACT

An application identifier display method includes: receiving a first input performed by a user; and displaying a scroll bar control on a target page in response to the first input. The scroll bar control is used to display at least one of a first-type application identifier or a second-type application identifier, the target page is a page of a desktop of the mobile terminal, the first-type application identifier is an application identifier in a page of the desktop other than the target page, and the second-type application identifier is an application identifier of an area in which the scroll bar control is located on the target page before the scroll bar control is displayed.

17 Claims, 15 Drawing Sheets

(51) Int. Cl.
  *G06F 3/0482* (2013.01)
  *G06F 3/04847* (2022.01)
  *G06F 3/04817* (2022.01)

(56) References Cited

U.S. PATENT DOCUMENTS

| | | | | |
|---|---|---|---|---|
| 11,442,600 | B2* | 9/2022 | Ni | G06F 3/0484 |
| 2010/0241507 | A1* | 9/2010 | Quinn | G06Q 30/0244 |
| | | | | 705/14.42 |
| 2011/0157027 | A1 | 6/2011 | Rissa | |
| 2013/0219319 | A1* | 8/2013 | Park | G06F 9/451 |
| | | | | 715/775 |
| 2013/0326583 | A1* | 12/2013 | Freihold | G06F 21/32 |
| | | | | 726/3 |
| 2014/0129957 | A1* | 5/2014 | Chou | G06F 3/0482 |
| | | | | 715/747 |
| 2014/0229898 | A1* | 8/2014 | Terwedo | G06F 3/04842 |
| | | | | 715/835 |
| 2014/0283142 | A1* | 9/2014 | Shepherd | G06F 21/6245 |
| | | | | 726/30 |
| 2015/0012853 | A1* | 1/2015 | Chaudhri | G06F 3/0482 |
| | | | | 715/765 |
| 2015/0113457 | A1* | 4/2015 | Li | G06F 3/0488 |
| | | | | 715/765 |
| 2015/0135160 | A1* | 5/2015 | Gauvin | G06F 8/71 |
| | | | | 717/109 |
| 2015/0199110 | A1* | 7/2015 | Nakazato | G06F 3/017 |
| | | | | 715/763 |
| 2015/0212670 | A1* | 7/2015 | Chang | G06F 3/0483 |
| | | | | 715/777 |
| 2015/0277741 | A1* | 10/2015 | Morse | G06F 3/04847 |
| | | | | 715/786 |
| 2016/0124610 | A1* | 5/2016 | Li | G06F 8/38 |
| | | | | 715/763 |
| 2016/0225086 | A1* | 8/2016 | Seitz | G06Q 40/06 |
| 2016/0274748 | A1* | 9/2016 | Feng | G06F 3/04817 |
| 2017/0038946 | A1* | 2/2017 | Deng | G06F 3/0488 |
| 2017/0109011 | A1* | 4/2017 | Jiang | G10L 15/22 |
| 2018/0348967 | A1* | 12/2018 | Kondrk | G06F 21/6209 |
| 2018/0356950 | A1* | 12/2018 | Bian | G06F 3/04842 |
| 2019/0250783 | A1* | 8/2019 | Ni | G06F 3/0482 |
| 2020/0272322 | A1* | 8/2020 | Zhu | G06F 3/0482 |
| 2020/0333944 | A1* | 10/2020 | Guo | G06F 3/0486 |
| 2020/0371648 | A1* | 11/2020 | Huang | G06F 3/0483 |

FOREIGN PATENT DOCUMENTS

| | | | | |
|---|---|---|---|---|
| CN | 104156155 | A | 11/2014 | |
| CN | 105122267 | A | 12/2015 | |
| CN | 105700773 | A | 6/2016 | |
| CN | 106775256 | A | 5/2017 | |
| CN | 107992244 | A | 5/2018 | |
| CN | 108052259 | A | 5/2018 | |
| CN | 108304575 | A | 7/2018 | |
| CN | 108491134 | A | 9/2018 | |
| CN | 110045890 | A | 7/2019 | |
| EP | 3521988 | A1 * | 8/2019 | G06F 3/0481 |
| KR | 10-2014-0087480 | A | 7/2014 | |
| KR | 10-2014-0094868 | A | 7/2014 | |

OTHER PUBLICATIONS

Written Opinion of the International Searching Authority of International Application No. PCT/CN2020/075385 dated May 20, 2020.
First Office Action of Priority Application No. CN201910181315.3 dated Jun. 11, 2020.
The Second Office Action of Priority Application No. CN201910181315.3 dated Sep. 24, 2020.

* cited by examiner

APPLICATION IDENTIFIER DISPLAY METHOD AND TERMINAL DEVICE

CROSS-REFERENCE TO RELATED APPLICATIONS

This application is a Bypass Continuation Application of PCT/CN2020/075385 filed on Feb. 14, 2020, which claims priority to Chinese Patent Application No. 201910181315.3 filed on Mar. 11, 2019, which are incorporated herein by reference in their entirety.

TECHNICAL FIELD

Embodiments of the present disclosure relate to the field of communications technologies, and in particular, to an application identifier display method and a terminal device.

BACKGROUND

With development of communications technologies, a terminal device such as a mobile phone and a tablet computer is becoming more and more intelligent, to meet various requirements of a user. For example, the user imposes a high requirement on convenience of operating an icon (that is, an application identifier) of an application program displayed by the terminal device.

SUMMARY

According to a first aspect, an embodiment of the present disclosure provides an application identifier display method, applied to a terminal device. The method includes: receiving a first input performed by a user; and displaying a scroll bar control on a target page in response to the first input, where the scroll bar control is used to display at least one of a first-type application identifier or a second-type application identifier, the target page is a page of a desktop of the terminal device, the first-type application identifier is an application identifier in a page of the desktop other than the target page, and the second-type application identifier is an application identifier of an area in which the scroll bar control is located on the target page before the scroll bar control is displayed.

According to a second aspect, an embodiment of the present disclosure further provides a terminal device. The terminal device includes: a receiving module and a display module, where the receiving module is configured to receive a first input performed by a user; and the display module is configured to display a scroll bar control on a target page in response to the first input received by the receiving module, where the scroll bar control is used to display at least one of a first-type application identifier or a second-type application identifier, the target page is a page of a desktop of the terminal device, the first-type application identifier is an application identifier in a page of the desktop other than the target page, and the second-type application identifier is an application identifier of an area in which the scroll bar control is located on the target page before the scroll bar control is displayed.

According to a third aspect, an embodiment of the present disclosure provides a terminal device, including a processor, a memory, and a computer program that is stored in the memory and executable on the processor, and when the computer program is executed by the processor, the steps of the application identifier display method in the first aspect are implemented.

According to a fourth aspect, an embodiment of the present disclosure provides a non-transitory computer-readable storage medium. The non-transitory computer-readable storage medium stores a computer program, and when the computer program is executed by a processor, the steps of the application identifier display method in the first aspect are implemented.

DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure shall fall within the protection scope of the present disclosure.

It should be noted that, the character "/" in this specification represents the meaning of "or", for example, A/B may represent A or B; and the term "and/or" in this specification describes only an association relationship for describing associated objects and represents that three relationships may exist. For example, A and/or B may represent the following three cases: Only A exists, both A and B exist, and only B exists. The term "a plurality of" refers to two or more.

It should be noted that in this embodiment of the present disclosure, the term such as "exemplary" or "for example" is used for representing an example, an illustration, or a description. Any embodiment or design scheme described as an "example" or "for example" in the embodiments of the present disclosure should not be explained as being more preferred or having more advantages than another embodiment or design scheme. To be precise, the use of the term such as "exemplary" or "for example" is intended to present a related concept in a specific manner.

In the specification and claims of the present disclosure, the terms "first", "second", and so on are intended to distinguish between different objects but do not describe a particular order of the objects. For example, a first input and a second input are intended to distinguish between different inputs, instead of describing a particular order of the inputs.

In the embodiments of the present disclosure, an example in which a clockwise direction, a counterclockwise direction, up, down, left, and right are inputs performed by a user on a display screen of a terminal device is used for description, that is, the clockwise direction, the counterclockwise direction, up, down, left, and right are inputs performed by the user on the display screen of the terminal device relative to the display screen of the terminal device or the terminal device.

Figure 1:
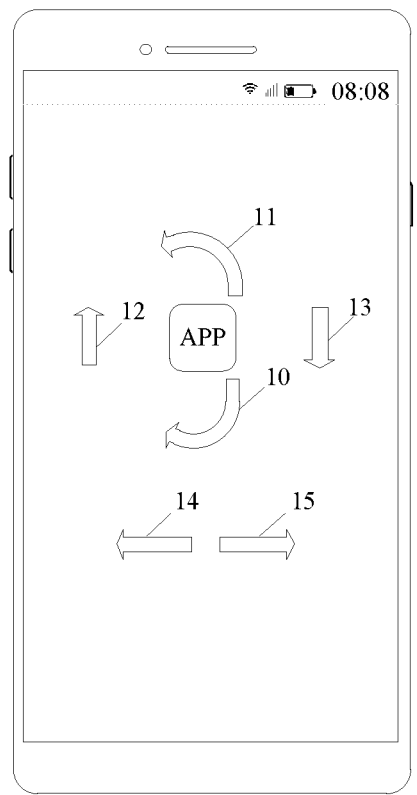
FIG. 1 is a schematic diagram of an operation performed by a user on an application identifier displayed by a terminal device according to an embodiment of the present disclosure.

For example, the user drags application identifiers (for example, icons of the application programs) in all directions. As shown in FIG. 1, on the display screen of the terminal device, 10 indicates that the user drags an application identifier in the clockwise direction, 11 indicates that the user drags an application identifier in the counterclockwise direction, 12 indicates that the user drags an application identifier upward, 13 indicates that the user drags an application identifier downward, 14 indicates that the user drags an application identifier leftward, and 15 indicates that the user drags an application identifier rightward. An application program may be referred to as an application (APP).

Currently, the terminal device usually displays many application identifiers on a screen, for example, a plurality of application identifiers may be separately displayed on a plurality of pages. In a case that the user needs to separately operate different application identifiers on different pages displayed on the screen of the terminal device, after the user operates one application identifier on one page, the user needs to perform a sliding input on the screen, to trigger the terminal device to switch the page displayed on the screen to another page, so that an application icon on the another page can be operated. In this way, in a case that many application identifiers are displayed on the screen of the terminal device, operations performed by the user on the application identifiers displayed on the screen are relatively cumbersome, for example, operations performed by the user on application identifiers on different pages displayed on the screen are relatively cumbersome.

According to an application identifier display method and a terminal device provided in the embodiments of the present disclosure, a scroll bar control may be displayed on a target page through a first input performed by a user, where the scroll bar control is used to display at least one of a first-type application identifier or a second-type application identifier, the target page is a page of a desktop of the terminal device, the first-type application identifier is an application identifier in a page of the desktop other than the target page, and the second-type application identifier is an application identifier of an area in which the scroll bar control is located on the target page before the scroll bar control is displayed. In this way, the user can conveniently obtain application identifiers on all pages of the terminal device by using the scroll bar control.

The terminal device in the embodiments of the present disclosure may be a mobile terminal device, or may be a non-mobile terminal device. The mobile terminal device may be a mobile phone, a tablet computer, a laptop computer, a palmtop computer, an in-vehicle terminal, a wearable device, a ultra-mobile personal computer (UMPC), a netbook, or a personal digital assistant (PDA). The non-mobile terminal may be a personal computer (PC), a television (TV), an automated teller machine or a self-service machine. This is not specifically limited in the embodiments of the present disclosure. In the following embodiments of the present disclosure, an example in which the terminal device is a mobile phone is used for description.

It should be noted that, in the application identifier display method provided in the embodiments of the present disclosure, an execution body may be a terminal device, a central processing unit (CPU) of the terminal device, or a control module configured to perform the application identifier display method in the terminal device. In the embodiments of the present disclosure, an example in which the terminal device performs the application identifier display method is used to describe the application identifier display method provided in the embodiments of the present disclosure.

The terminal device in the embodiments of the present disclosure may be a terminal device with an operating system. The operating system may be an Android operating system, or may be an iOS operating system, or may be another possible operating system, which is not specifically limited in this embodiment of the present disclosure.

The following uses the Android operating system as an example to describe a software environment to which the application identifier display method provided in the embodiments of the present disclosure is applied.

Figure 2:
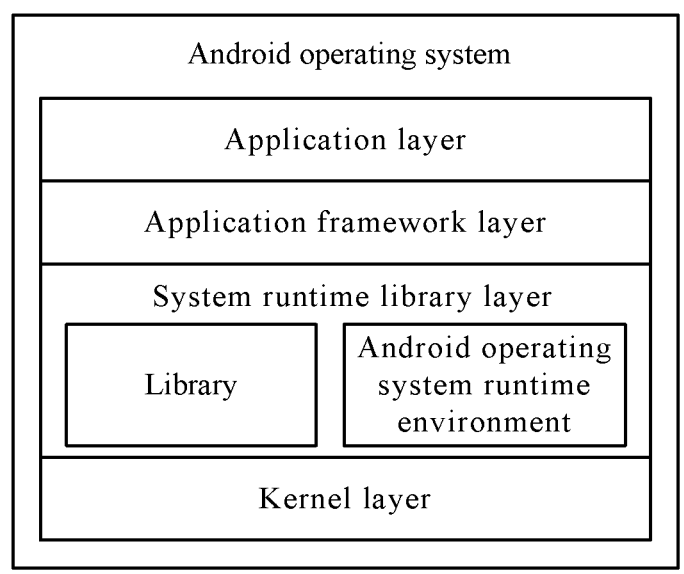
FIG. 2 is a schematic architectural diagram of a possible Android operating system according to an embodiment of the present disclosure.

As shown in FIG. 2, FIG. 2 is a schematic architectural diagram of a possible Android operating system according to an embodiment of the present disclosure. In FIG. 2, the architecture of the Android operating system includes 4 layers: an application layer, an application framework layer, a system runtime library layer, and a kernel layer (specifically, may be a Linux kernel layer).

The application layer includes various applications in the Android operating system (including system applications and third-party applications).

The application program framework layer is an application program framework, and the developer may develop some application programs based on the application program framework layer when following a development rule of the application program framework, for example, application programs such as a system setting application, a system chat application, and a system camera application; or application programs such as a third-party setting application, a third-party camera application, and a third-party chat application.

The system runtime library layer includes a library (also referred to as a system library) and an Android operating system runtime environment. The library mainly provides various resources required for the Android operating system. The running environment of the Android operating system is used for providing a software environment for the Android operating system.

The kernel layer is an operating system layer of the Android operating system, and is a lowest layer of software levels of the Android operating system. The kernel layer provides core system services and hardware-related drivers for the Android operating system based on the Linux kernel.

The Android operating system is used as an example. In the embodiments of the present invention, a developer may develop, based on the system architecture of the Android operating system shown in FIG. 2, a software program to implement the application identifier display method provided in the embodiments of the present invention, so that the application identifier display method can run based on the Android operating system shown in FIG. 2. That is, a processor or a terminal device may run the software program in the Android operating system to implement the application identifier display method provided in the embodiments of the present disclosure.

Figure 3:
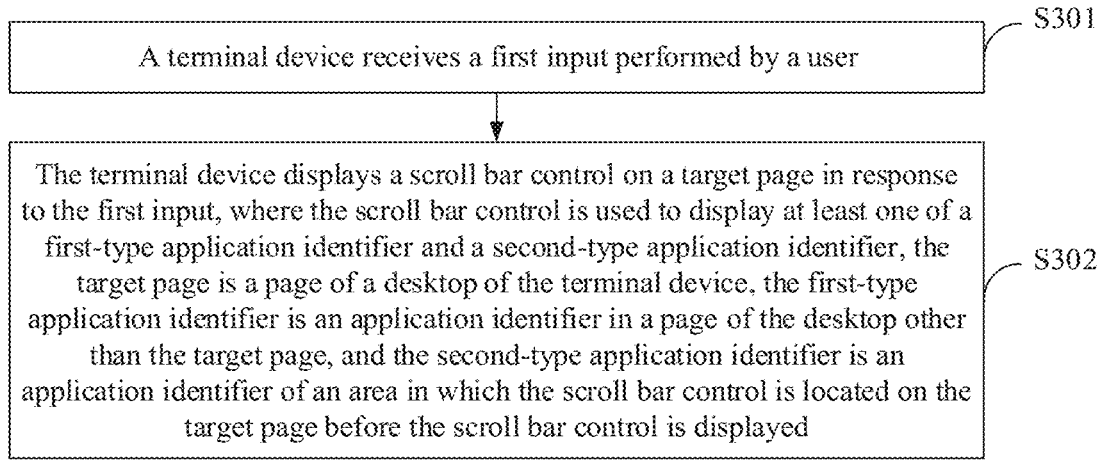
FIG. 3 is a schematic flowchart of an application identifier display method according to an embodiment of the present disclosure.

The following describes in detail the application identifier display method provided in the embodiments of the present disclosure with reference to a flowchart of an application identifier display method shown in FIG. 3. Although a logical sequence of the application identifier display method provided in the embodiments of the present invention is shown in the method flowchart, in some cases, the shown or described steps may be performed in a sequence different from the sequence herein. For example, the application identifier display method shown in FIG. 3 may include S301 and S302.

S301: A terminal device receives a first input performed by a user.

It may be understood that, in this embodiment of the present disclosure, the first input performed by the user may be an input in which the user triggers the terminal device to display the scroll bar control.

For example, the first input may be an input performed by the user on any page of a desktop of the terminal device, for example, the page is a home page of the desktop, or the page is a minus one screen page.

Optionally, in this embodiment of the present disclosure, the first input may be a touch and hold operation or a tap operation performed by the user on a page of the desktop currently displayed by the terminal device, and an input manner of the first input may be specifically determined based on an actual use requirement. This is not limited in this embodiment of the present disclosure.

For example, the touch and hold operation may be an operation in which a pressure value is greater than or equal to a preset pressure value and pressing duration is greater than or equal to preset pressing duration, and the tap operation may be an operation in which a preset quantity of times of tapping is continuously performed.

S302: The terminal device displays a scroll bar control on a target page in response to the first input, where the scroll bar control is used to display at least one of a first-type application identifier or a second-type application identifier, the target page is a page of a desktop of the terminal device, the first-type application identifier is an application identifier in a page of the desktop other than the target page, and the second-type application identifier is an application identifier of an area in which the scroll bar control is located on the target page before the scroll bar control is displayed.

Optionally, the target page may be a home page of the desktop of the terminal device.

Optionally, in this embodiment of the present disclosure, the terminal device may display the scroll bar control in a first area on the target page.

Optionally, the first area may be a preset area on the target page. For example, the first area may be an area that is on the target page and in which an operation habit of the user is met. For example, the first area is an area in which the user can perform a single-hand operation on the target page, for example, the first area may be located in the lower ⅓ of the target page.

It may be understood that, generally, the upper ⅓ of the page displayed by the terminal device is an area in which the user cannot perform a single-hand operation, the middle ⅓ of the page is an area in which it is relatively difficulty for the user to perform a single-hand operation, and the lower ⅓ of the page is an area in which the user easily performs a single-hand operation. In this way, the terminal device may set the first area on the target page in the lower ⅓ of the target page, to improve convenience of operating an application identifier in the scroll bar control by the user.

For example, currently, the terminal device may arrange application identifiers horizontally on any page of the desktop, for example, arrange the application identifiers from left to right. Application identifiers at the bottom row of the home page are generally common application identifiers such as a dial-up application identifier, a contact application identifier, and an SMS application identifier. In this case, an area in which the second row in a bottom-up direction on the home page is located may be the first area.

Optionally, the first area may be an area in which an application identifier is not displayed on the target page and an area size is greater than or equal to a preset size. The preset size may be a display size of the scroll bar control.

It may be understood that, in a case that the display size of the scroll bar control is limited and a quantity of application identifiers included in the scroll bar control is relatively large, some application identifiers displayed by the terminal device in the scroll bar control are visible to the user at a same moment, and other application identifiers are invisible to the user. An application identifier currently displayed by the terminal device is an application identifier visible to the user, and an application identifier that is in the scroll bar control and that can be displayed only when the user triggers the application identifier in the scroll bar control is an application identifier invisible to the user.

It should be emphasized that in this embodiment of the present disclosure, a sliding input performed by the user on the scroll bar control (for example, a leftward sliding input or a rightward sliding input) may trigger the terminal device to switch to display an application identifier visible to the user in the scroll bar control, that is, application identifiers in the scroll bar control are scrolled for display. In addition, a sliding input (for example, a leftward sliding input or a rightward sliding input) performed by the user in an area other than the first area in which the scroll bar control is located on the target page may trigger the terminal device to switch a currently displayed page from the target page to a page of the desktop other than the target page.

Optionally, in this embodiment of the present disclosure, a shape of the scroll bar control (that is, a shape of a border of the scroll bar control) may be any possible shape such as an ellipse, a rectangle, a diamond, or a polygon. Specifically, the shape may be determined based on an actual use requirement. This is not limited in this embodiment of the present disclosure.

Optionally, in this embodiment of the present disclosure, the scroll bar control may be superposed on the target page of the terminal device. For example, an application identifier in the scroll bar control is opaque, and the border of the scroll bar control may be displayed on the target page of the terminal device based on a first transparency. For example, if the first transparency is recorded as T1, a value range of T1 may be 0%≤T1≤100%.

It may be understood that even if a value of the first transparency T1 is 0%, that is, the border of the scroll bar control displayed by the terminal device is transparent, a sliding input performed by the user on the scroll bar control (for example, a leftward sliding input or a rightward sliding input) may trigger the terminal device to switch to display an application identifier visible to the user in the scroll bar control.

It should be noted that, in this embodiment of the present disclosure, one application identifier in the scroll bar control may uniquely correspond to one application program.

Optionally, in this embodiment of the present disclosure, an application identifier in the scroll bar control may be an icon of a shortcut of an application program, or may be another icon that can uniquely correspond to the application program. The icon may be determined based on an actual use requirement, which is not limited in this embodiment of the present disclosure. For example, regardless of whether an application identifier is located in the scroll bar control or any page of the desktop, the application identifier is an entry of a same application program.

The application identifier display method provided in this embodiment of the present disclosure may be applied to a plurality of scenarios, for example, the following scenario 1 to scenario 3.

Scenario 1: In this embodiment of the present disclosure, before the terminal device displays the scroll bar control, in a case that the first area does not include an application identifier, application identifiers included in the scroll bar control are all the first-type application identifier. That is, the application identifiers in the scroll bar control on the target page are all application identifiers on a page of the desktop other than the target page.

It may be understood that, in this embodiment of the present disclosure, each first-type application identifier displayed by the terminal device in the scroll bar control may be an icon of a shortcut of an application program. In this case, for an application program indicated by a first-type application identifier, the terminal device may continue to display an application identifier of the application program on a page of the desktop other than the target page.

In the following embodiment, for an application program, both an icon in the scroll bar control and an icon in a page of the desktop other than the target page are application identifiers of the application program. Regardless of whether an application identifier of a same application program is in the scroll bar control or is in an area on any page of the desktop other than the scroll bar control, the application identifier is an entry to the application program.

Optionally, an application identifier of an application program in the scroll bar control may be different from an application identifier of the application program in an area in the desktop other than the scroll bar control. A previous application identifier is obtained by adding a symbol pattern (such as a symbol "☆") to an upper right corner of a current application identifier. Alternatively, an application identifier of an application program in the scroll bar control is the same as an application identifier of the application program in an area if the desktop other than the scroll bar control.

For example, in this embodiment of the present disclosure, the desktop of the terminal device includes a page 1 and a page 2, where the page 1 is a home page of the desktop, and the page 1 is the target page of the terminal device in this case. The page 2 includes an application identifier A1, an application identifier A2, an application identifier A3, an application identifier A4, and an application identifier A5. Before the terminal device displays the scroll bar control in the first area (denoted as an area P1) in the page 1, if the first area does not include an application identifier, the scroll bar control displayed subsequently by the terminal device in the first area includes the application identifier A1 to the application identifier A5. In this case, the page 2 still includes the application identifier A1 to the application identifier A5.

Optionally, after receiving the first input, the terminal device may obtain an application identifier of a page of the desktop other than the target page. Therefore, the terminal device may subsequently display these application identifiers in the scroll bar control.

Figure 4A:
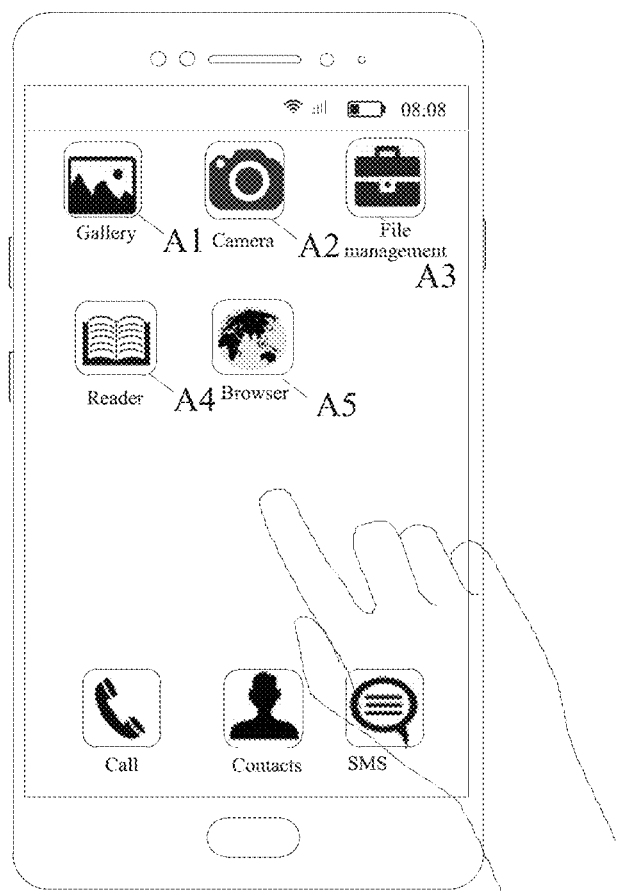
FIG. 4A is a first schematic diagram of a page displayed by a terminal device according to an embodiment of the present disclosure.
Figure 4B:
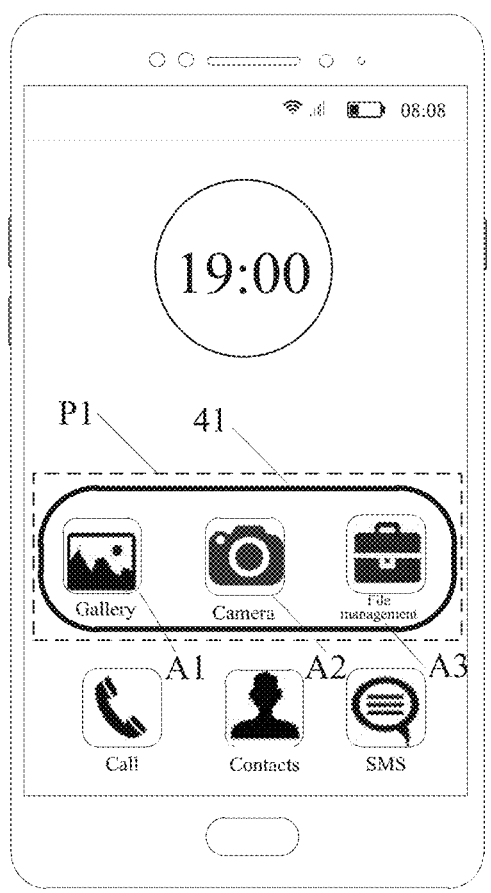
FIG. 4B is a second schematic diagram of a page displayed by a terminal device according to an embodiment of the present disclosure.

For example, as shown in FIGS. 4A and 4B, FIGS. 4A and 4B is a schematic diagram of content displayed by a terminal device according to an embodiment of the present disclosure. A page (such as the foregoing page 2) of the terminal device shown in FIG. 4A includes the application identifier A1 to the application identifier A5. After receiving a touch and hold operation (that is, the first input) performed by the user on a blank area on the page shown in FIG. 4B, the terminal device may display a page shown in FIG. 4B (such as the foregoing page 1), and the scroll bar control 41 is displayed in the area P1 of the page. The scroll bar control 41 includes the application identifier A1 to the application identifier A3 that are visible to the user, and the application identifier A4 and the application identifier A5 that are invisible to the user.

Scenario 2: In this embodiment of the present disclosure, before the terminal device displays the scroll bar control, in a case that the first area on the target page includes an application identifier, application identifiers in the scroll bar control may include the first-type application identifier and the second-type application identifier.

It may be understood that, in a case that the first area used by the terminal device to display the scroll bar control on the target page is a preset area, when the scroll bar control is not displayed on the target page, the first area may include some application identifiers (that is, the second-type application identifier). In this case, when the terminal device displays the scroll bar control in the first area on the target page, the terminal device may display these second-type application identifiers in the scroll bar control, so as not to cause impact on the user of operating a second-type application icon originally displayed in the first area. For example, the scroll bar control is not only used to display the first-type application identifier, but also used to display the second-type application identifier.

For example, in this embodiment of the present disclosure, the desktop of the terminal device includes a page 1 and a page 2, where the page 1 is a home page of the desktop, and the page 1 is the target page of the terminal device in this case. The page 2 includes the application identifier A1 to the application identifier A5. Before the terminal device displays the scroll bar control in the first area (denoted as an area P1) on the page 1, if the first area includes an application identifier A6 and an application identifier A7, the scroll bar control subsequently displayed by the terminal device in the first area includes the application identifier A1 to the application identifier A5, the application identifier A6, and the application identifier A7.

Scenario 3: In this embodiment of the present disclosure, before the terminal device displays the scroll bar control, in a case that the first area on the target page includes an application identifier, and a page of the desktop other than the target page does not include an application identifier, application identifiers in the scroll bar control may include the second-type application identifier.

It may be understood that, in a case that the scroll bar control is displayed on the target page, if a new application identifier appears on a page of the desktop of the terminal device other than the target page, the terminal device may add the application identifier to the scroll bar control.

For example, in this embodiment of the present disclosure, the desktop of the terminal device includes a page 1 and a page 2, where the page 1 is a home page of the desktop, and the page 1 is the target page in the terminal device in this case. The page 2 does not include an application identifier. Before the terminal device displays the scroll bar control in the first area on the page 1, if the first area includes an application identifier A6 and an application identifier A7, the scroll bar control subsequently displayed by the terminal device in the first area includes the application identifier A6 and the application identifier A7.

Optionally, the user may perform an open input on any application identifier in the scroll bar control, to trigger the terminal device to open an application program corresponding to the application identifier, that is, display a running page of the application program. For example, an open input performed by the user on an application identifier may be an upward sliding input on the application identifier. Certainly, an input form of the open input may be another implementable input manner. This is not limited in this embodiment of the present disclosure.

Optionally, in a case that the user does not need to operate the scroll bar control, the user may perform an input on the terminal device, to trigger the terminal device to cancel display of the scroll bar control on the target page. For example, the input may be the same as the first input.

It should be noted that according to the application identifier display method provided in this embodiment of the present disclosure, a scroll bar control may be displayed on a target page through a first input performed by a user, where the scroll bar control is used to display at least one of a first-type application identifier or a second-type application identifier, the target page is a page of a desktop of the terminal device, the first-type application identifier is an application identifier in a page of the desktop other than the target page, and the second-type application identifier is an application identifier of an area in which the scroll bar control is located in the target page before the scroll bar control is displayed. Based on this solution, because the scroll bar control displayed on the target page by the terminal device may include a first-type application identifier, the user may operate an application identifier in a page of the desktop other than the target page in the scroll bar control displayed on the target page, without controlling the terminal device to jump to a page of the desktop other than the target page. In addition, the scroll bar control may include a second-type application identifier. Therefore, even if the scroll bar control displayed by the terminal device shields some application identifiers that are originally displayed on the target page, the terminal device may subsequently provide these application identifiers for the user by using the scroll bar control. In this way, the user can operate, on the target page, all application identifiers provided by the terminal device, thereby simplifying an operation performed by the user on application identifiers included in different pages in the desktop of the terminal device, and improving convenience of operating, by the user, the application identifiers provided by the terminal device. In addition, because the terminal device displays the first-type application identifier on the target page by using the scroll bar control, instead of directly displaying the first-type application identifier on the target page, application identifiers displayed on the target page by the terminal device are relatively concise and aesthetic.

In a possible implementation, in the application identifier display method provided in this embodiment of the present disclosure, a plurality of application identifiers included in the scroll bar control may be arranged in a specific order.

For example, a first application identifier is displayed in a first position, a second application identifier is displayed in a second position, the first position and the second position are different positions in the scroll bar control, and the first position is a display position before the second position in the scroll bar control; and the first application identifier is an application identifier preset by the user in the scroll bar control, and the second application identifier is an application identifier in the scroll bar control other than the application identifier preset by the user.

A foremost position in the scroll bar control is a position of the first application identifier displayed in the scroll bar control. Certainly, when application identifiers in the scroll bar control are not scrolled for display, the first application identifier is visible to the user. Correspondingly, the last application identifier is displayed in a rearmost position of the scroll bar control.

For example, in a case that the application identifiers in the scroll bar control are arranged in a left-to-right direction, a position on the left side of the scroll bar control is before a position on the right side, that is, the first position is located on the left side of the second position.

Alternatively, for example, in a case that the application identifiers in the scroll bar control are arranged in an up-to-down direction, a position on the upper side of the scroll bar control is before a position on the lower side, that is, the first position is above the second position.

For example, in the foregoing scenario 1 or scenario 2, the scroll bar control includes M first target application identifiers, the M first target application identifiers are all the first-type application identifier, and M is a positive integer. In this case, the terminal device displays a first application identifier in the M first target application identifiers in the first position, and displays a second application identifier in the M first target application identifiers in the second position. That is, the terminal device displays an application identifier (that is, the first application identifier) preset by the user in the M first target application identifiers at a front position in the scroll bar control, and arranges another application identifier in the M first target application identifiers at a back position in the scroll bar control.

Optionally, in the foregoing scenario 2 or scenario 3, the scroll bar control includes may include N second target application identifiers, the N second target application identifiers are all the second-type application identifier, and N is a positive integer. In this case, the terminal device displays a first application identifier in the N second target application identifiers in the first position, and displays a second application identifier in the N second target application identifiers in the second position.

It may be understood that, in this embodiment of the present disclosure, the first position and the second position in the scroll bar control are opposite, that is, the first position and the second position are not specific positions, but it indicates that the first position is before the second position.

For example, with reference to the foregoing example in FIGS. 4A and 4B, the M first target application identifiers include the application identifier A1 to the application identifier A5, that is, M is equal to 5. For example, the application identifier A1 to the application identifier A3 in the M first target application identifiers may be application identifiers preset by the user, and the application identifier A4 and the application identifier A5 may be application identifiers (that is, application identifiers that are not preset by the user) in the M first target application identifiers other than the application identifiers preset by the user.

Optionally, in this embodiment of the present disclosure, the user may set, in a function option used to set the scroll bar control in a setting application (for example, a system setting application) of the terminal device, the application identifiers preset by the user, for example, the application identifier A1 to the application identifier A3 are used as the application identifiers preset by the user.

It may be understood that the terminal device may use an application identifier of an application program with relatively high operation frequency as the application identifier preset by the user. In comparison with an application identifier that is not preset by the user, the user tends to operate the application identifier preset by the user.

Optionally, in this embodiment of the present disclosure, display positions of different application identifiers in a plurality of application identifiers preset by the user in the scroll bar control are different. The user may separately set application identifiers for positions in the scroll bar control (for example, the several front-most positions).

It may be understood that, as the terminal device continues to run, the terminal device does not change positions in which the application identifiers preset by the user are arranged in the scroll bar control, that is, the application identifiers preset by the user may be continuously displayed in the front-most positions in the scroll bar control. In this way, in a case that the user needs to frequently operate the application identifiers preset by the user, convenience of operating these application identifiers by the user is improved.

It should be noted that in the application identifier display method provided in this embodiment of the present disclosure, the terminal device may display the first application identifier in the first position in the scroll bar control, and display the second application identifier in the second position, that is, display the application identifier preset by the user in a front position, and display an application identifier other than the application identifiers preset by the user in a rear position. In this way, in a case that the user needs to frequently operate the application identifier preset by the user, the user does not need to switch a page or even trigger to switch an application identifier visible to the user in the scroll bar control. Instead, these application identifiers may be operated in front positions in the scroll bar control, thereby helping the user quickly and conveniently operate an application identifier required by the user.

In a possible implementation, in the application identifier display method provided in this embodiment of the present disclosure, application identifiers in the scroll bar control are arranged based on a target display priority, and the target display priority is determined based on a use parameter of an application identifier in the scroll bar control; and the use parameter includes any one of the following: use duration of the application identifier and use frequency of the application identifier.

Optionally, all application identifiers in the scroll bar control are arranged based on the target display priority, for example, the first-type application identifier and the second-type application identifier in the scroll bar control are arranged based on the target display priority.

Optionally, if a value of a use parameter of an application identifier in the scroll bar control is larger, a display priority of the application identifier is higher, that is, the terminal device arranges the application identifier with the larger value of the use parameter in a front position of the scroll bar control.

It may be understood that if the value of the use parameter of the application identifier is larger, it indicates that the user uses an application program indicated by the application identifier more frequently. Generally, the user tends to operate the application identifier with the larger value of the use parameter.

Optionally, use duration of an application identifier may be duration in which an application program indicated by the application identifier runs continuously in a foreground most recently. Alternatively, use duration of an application identifier may be duration in which an application program indicated by the application identifier runs continuously in a foreground within most recent preset duration, for example, the preset duration is 48 hours.

Optionally, use frequency of an application identifier may be a quantity of times that an application program indicated by the application identifier runs continuously in a foreground within most recent preset duration, for example, the preset duration is 48 hours.

It may be understood that, with continuous running of the terminal device, the terminal device may update use parameters of application identifiers based on operations performed by the user on different application identifiers. Further, the terminal device may re-arrange application identifiers in the scroll bar control based on application identifiers with updated use parameters.

Optionally, a value of a use parameter of an application identifier is determined by an operation performed by the user on the application identifier in the scroll bar control and an operation performed on the application identifier in an area in the desktop other than an area in which the scroll bar control is located.

It should be noted that in the application identifier display method provided in this embodiment of the present disclosure, the terminal device may arrange the application identifiers in the scroll bar control based on a target priority, that is, a display priority of an application identifier in the scroll bar control is determined based on a use parameter (for example, use duration or use frequency) of the application identifier, so that an application identifier with a larger value of a user parameter is arranged in a front position of the scroll bar control. Therefore, the user conveniently searches for and operates an application identifier with a larger value of a user parameter in the scroll bar control, that is, the user conveniently searches for and operates an application identifier that meets a user requirement in the scroll bar control.

Optionally, in this embodiment of the present disclosure, in the foregoing scenario 1 or scenario 2, in a case that the terminal device displays the first application identifier in the first position in the scroll bar control and displays the second application identifier in the second position, a plurality of second application identifiers may be arranged based on the target display priority. That is, the terminal device may display the second application identifier with a higher priority in the second position at the front based on the target priority.

For example, in the foregoing scenario 1 or scenario 2, M first target application identifiers in the scroll bar control include X first target application identifiers and Y first target application identifiers, the X first target application identifiers are application identifiers preset by the user, the Y first target application identifiers are application identifiers (that is, application identifiers that are not preset by the user) in the M application identifiers other than the application identifiers set by the user, X and Y are both positive integers less than or equal to M, and X+Y=M.

The X first target application identifiers are displayed in front positions in the scroll bar control, and the Y first target application identifiers are displayed in rear positions in the scroll bar control. In addition, a first target application identifier with a higher display priority in the Y first target application identifiers is displayed in a front position in the scroll bar control, and a first target application identifier with a lower display priority in the Y first target application identifiers is displayed in a rear position in the scroll bar control.

For example, with reference to the foregoing example in FIGS. 4A and 4B, the application identifier A1 to the application identifier A5 in the scroll bar control are sequentially backward. Display priorities of the application identifier A1 to the application identifier A3 may be preset by the user, and a value of a use parameter of the application identifier A4 may be greater than a value of a use parameter of the application identifier A5.

It should be noted that in the application identifier display method provided in this embodiment of the present disclosure, the terminal device may display an application identifier preset by the user in a front position in the scroll bar control and an application identifier (that is, an application identifier that is not preset by the user) other than the application identifier preset by the user in a rear position, and may display, based on a target priority, these application identifiers that are not preset by the user. Therefore, the user can conveniently search for and operate these application identifiers preset by the user in the scroll bar control.

In a possible implementation, in the method provided in this embodiment of the present disclosure, in the foregoing scenario 2, in addition to M first target application identifiers (that is, the first-type application identifier), the scroll bar control may further include N second target application identifiers (that is, the second-type application identifier).

Optionally, a display priority of an application identifier preset by the user in the first-type application identifier is higher than a display priority of the second-type application identifier, and the display priority of the second-type application identifier is higher than a display priority of an application identifier that is not preset by the user in the first-type application identifier. That is, the terminal device displays the application identifier preset by the user in the first-type application identifier in a foremost position in the scroll bar control, displays the second-type application identifier in a relatively rear position in the scroll bar control, and then displays the application identifier that is not preset by the user in the first-type application identifier in a rearmost position in the scroll bar control.

For example, the first display priority may be that display priorities of the X first target application identifiers are higher than display priorities of the N second target application identifiers, and the display priorities of the N second target application identifiers are higher than display priorities of the Y first target application identifiers.

Similarly, in this embodiment of the present disclosure, the terminal device may display an application identifier preset by the user in the N second target application identifiers in a front position in the scroll bar control, and display an application identifier that is not preset by the user in the N second target application identifiers in a rear position in the scroll bar control.

For example, with reference to the example in the foregoing scenario 2, the N second target application identifiers may include the application identifier A6 and the application identifier A7, that is, N is equal to 2.

It should be noted that in the application identifier display method provided in this embodiment of the present disclosure, because the terminal device may successively display the application identifier preset by the user in the first-type application identifier, the second-type application identifier, and the application identifier that is not preset by the user in the first-type application identifier in the scroll bar control from the front to the rear positions, and a probability that the user operates these application identifiers generally decreases in sequence, thereby further improving convenience of searching for and operating an application identifier in the scroll bar control by the user.

In a possible implementation, in the application identifier display method provided in this embodiment of the present disclosure, the first input includes a first sub-input, a second sub-input, and a third sub-input. S302 in the foregoing embodiment may be implemented by S302a, S302b, and S302c.

S302a. The terminal device displays a first page in response to the first sub-input, where the first page includes a first control.

The first page may be a scroll bar control setting page of a desktop setting environment provided by the terminal device, and content in the page is used to set the scroll bar control. For example, the first page may include one or more controls, the one or more controls are all used to set the scroll bar control, and the first control is a control in the one or more controls.

In some embodiments, the first sub-input is used to trigger the terminal device to display the first page, that is, the scroll bar control setting page.

For example, the first sub-input may be an input performed by the user on any page of a desktop of the terminal device, for example, the page is a home page of the desktop, or the page is a page of a negative one screen. In some examples, the first sub-input may be an input performed by the user in a blank area on any page of the desktop of the terminal device.

Optionally, in this embodiment of the present disclosure, the first sub-input may be a touch and hold operation or a click operation performed by the user on a page of the desktop currently displayed by the terminal device, and may be specifically determined based on an actual use requirement. This is not limited in this embodiment of the present disclosure.

For example, the touch and hold operation may be an operation in which a pressure value is greater than or equal to a preset pressure value and pressing duration is greater than or equal to preset pressing duration, and the tap operation may be an operation in which a preset quantity of times of tapping is continuously performed. It may be understood that input manners of the first input and the first sub-input may be the same.

S302b. The terminal device executes a target action corresponding to the first control in response to the second sub-input performed on the first control.

The target action includes at least one of the following: starting the scroll bar control, hiding a border of the scroll bar control, or adding an application identifier preset by the user to the scroll bar control.

In example 1, the first control is used to trigger the terminal device to select to start scrolling of the home page, that is, to select whether to display the scroll bar control on the target page. In this case, the target action is "starting the scroll bar control".

Figure 5:
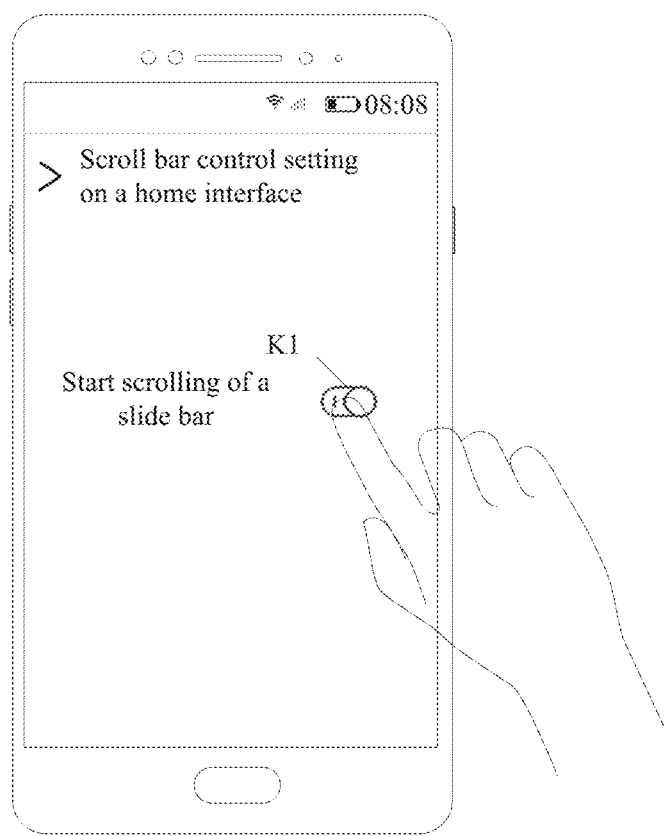
FIG. 5 is a third schematic diagram of a page displayed by a terminal device according to an embodiment of the present disclosure.

For example, with reference to the foregoing example in FIGS. 4A and 4B, after receiving an input (that is, the first sub-input) performed by the user shown in FIG. 4A, the terminal device may display a page shown in FIG. 5 (that is, the first page), where the page includes a control K1 (for example, the first control). The control K1 is used to trigger the terminal device to display the scroll bar control in the desktop.

For example, after the user performs an input on the control K1 shown in FIG. 5, the terminal device may switch the currently displayed page shown in FIG. 5 to a page shown in FIG. 4B, where the page includes a scroll bar control 41.

In example 2, one or more controls on the first page may include two sub-controls, for example, a sub-control (for example, the control K1) used to trigger the terminal device to select whether to display the scroll bar control on the target page, and a sub-control used to trigger the terminal device to add an application identifier preset by the user to the scroll bar control.

Optionally, the sub-control used to trigger the terminal device to add the application identifier preset by the user to the scroll bar control is specifically used to trigger the terminal device to display a second page, where the second page includes at least one second control, and each second control in the at least one second control is used to trigger to add an application identifier preset by the user to the scroll bar control. Different second controls in the at least one second control correspond to different positions in the scroll bar control.

For example, a position of the at least one second control on the second page from the front to the rear sequentially corresponds to at least one position in the scroll bar control from the front to the rear. For example, the 1st second control in the at least one second control corresponds to the first position in the scroll bar control, and the 2nd second control corresponds to the second position in the scroll bar control.

Optionally, each second control may trigger the terminal device to switch the currently displayed second page to a page of the desktop other than the target page, so that the user can select an application identifier from the page.

Alternatively, each second control may trigger the terminal device to overlay an application identifier list on the second page, where the list includes application identifiers on a page of the desktop other than the target page, so that the user can select an application identifier from the list.

Figure 6A:
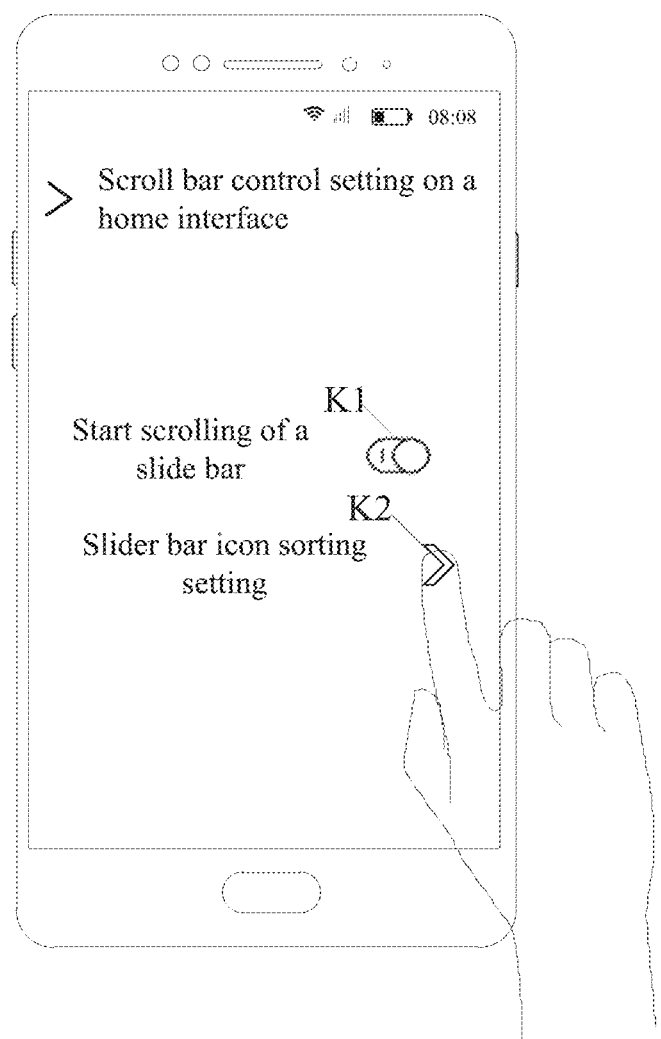
FIG. 6A is a fourth schematic diagram of a page displayed by a terminal device according to an embodiment of the present disclosure.

For example, with reference to the page shown in FIG. 5, a page (that is, the first page) of the terminal device shown in FIG. 6A includes a control K1 and a control K2. Then, the user may perform an input on the control K2 to trigger the terminal device to display a page (that is, the second page) shown in FIG. 6B. The page includes a control K3, a control K4, and a control K5 (that is, the at least one second control).

After the user selects an application identifier through a second control, the terminal device may display the application identifier in a position in which the second control is located.

Figure 6B:
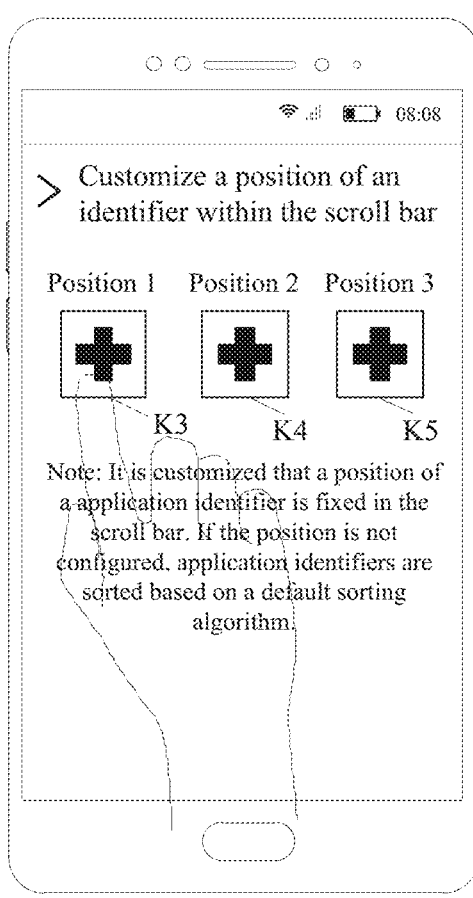
FIG. 6B is a fifth schematic diagram of a page displayed by a terminal device according to an embodiment of the present disclosure.
Figure 6C:
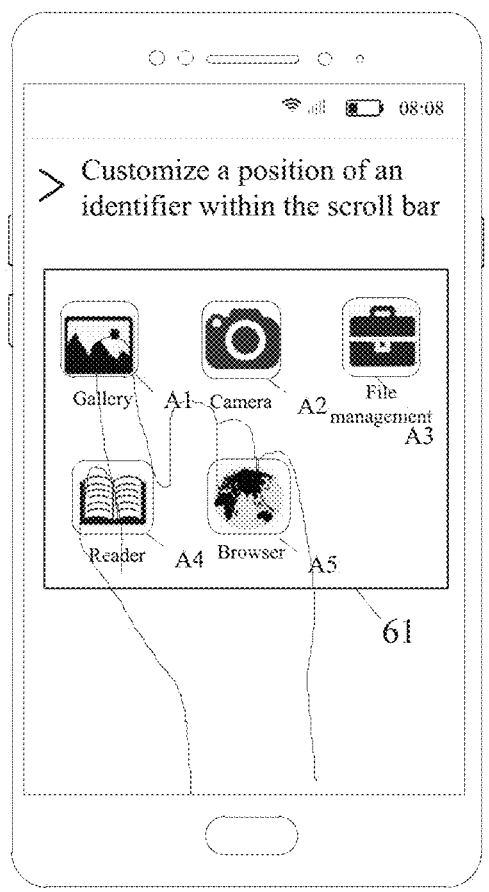
FIG. 6C is sixth a schematic diagram of a page displayed by a terminal device according to an embodiment of the present disclosure.
Figure 6D:
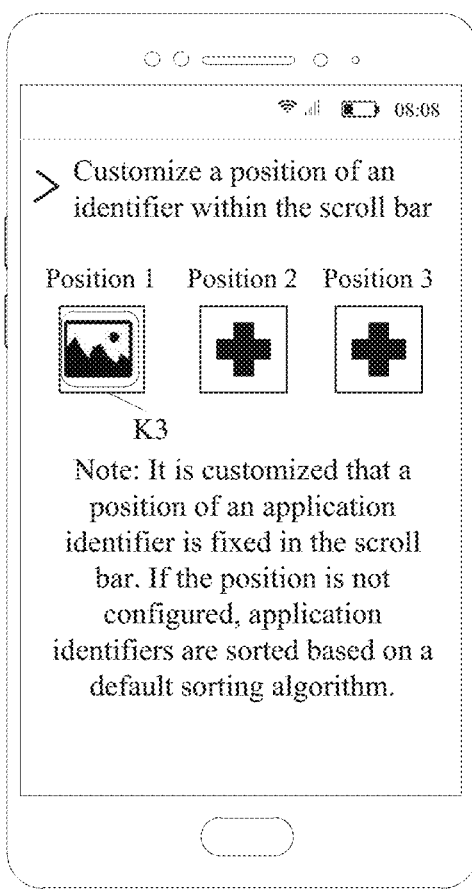
FIG. 6D is a seventh schematic diagram of a page displayed by a terminal device according to an embodiment of the present disclosure.

For example, an input performed by the user on the control K3 shown in FIG. 6B may trigger the terminal device to display the application identifier list 61 shown in FIG. 6C, to select the application identifier A1 from the list 61, and display the application identifier A1 selected by the user in a location in which the control K3 shown in FIG. 6D is located.

Similarly, the user may control the terminal device to separately select the application identifier A1 to the application identifier A3 from the list 61 by using the control K3 to the control K5. Then, the terminal device may display the application identifier A1 selected by the user in a location in which the control K3 is located, display the application identifier A2 selected by the user in a location in which the control K2 is located, and display the application identifier A3 selected by the user in a location in which the control K3 is located.

In example 3, the first page may further include a sub-control used to modify an effect parameter of the scroll bar control. In this case, the target action is "hiding a border of the scroll bar control".

For example, the user triggers the terminal device to perform the action of "hiding the border of the scroll bar control", and may trigger the terminal device to select whether to display the border of the scroll bar control by using a transparency 0% or a transparency 100%. That is, the effect parameter may be whether the border of the scroll bar control is hidden.

Figure 7A:
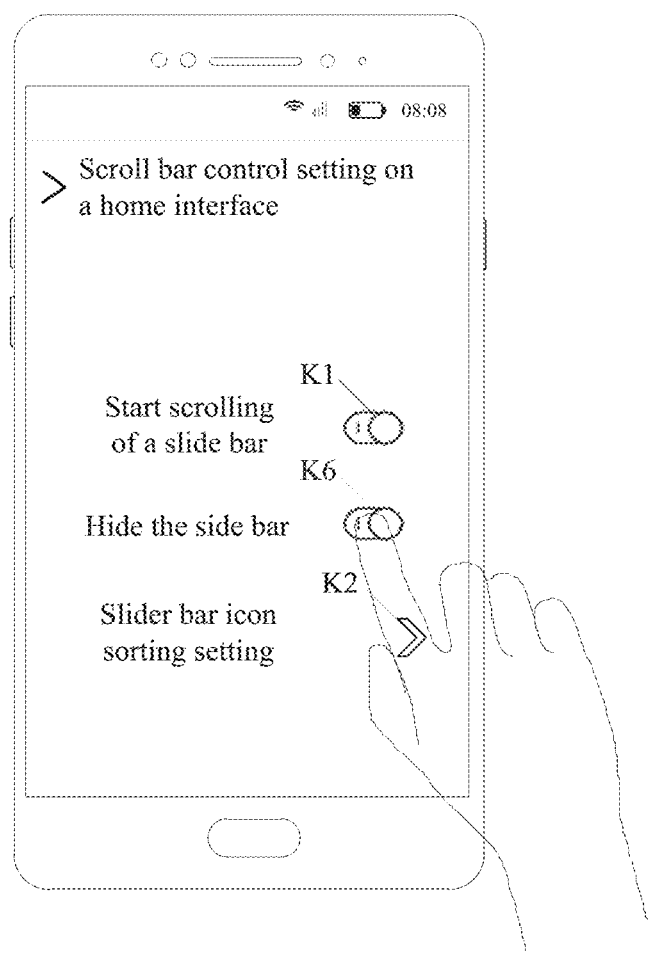
FIG. 7A is a eighth schematic diagram of a page displayed by a terminal device according to an embodiment of the present disclosure.
Figure 7B:
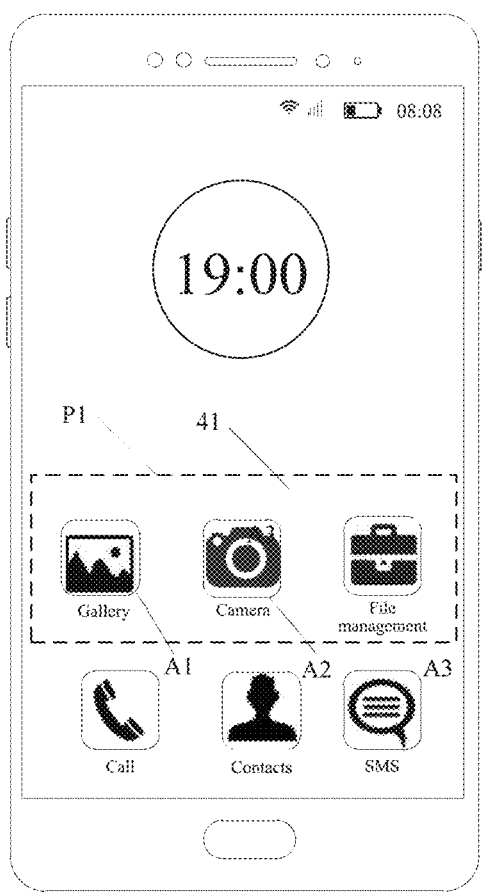
FIG. 7B is a ninth schematic diagram of a page displayed by a terminal device according to an embodiment of the present disclosure.

For example, with reference to a page (that is, the first page) of the terminal device shown in FIG. 6A, a page (that is, the first page) shown in FIG. 7A further includes a control K6. An input performed by the user on the control K6 may trigger the terminal device to display a page (that is, the target page) shown in FIG. 7B. A border of the scroll bar control 41 on the page is displayed with a transparency 100%, that is, the terminal device hides the border of the scroll bar control.

It may be understood that the terminal device may support, by using at least one second control on the second page, the user selecting a preset application identifier. In this way, the user can select an application identifier based on a requirement of the user, thereby improving diversity of displaying an application identifier by the terminal device.

S302c. Display the scroll bar control on the target page in response to the third sub-input.

After the user performs the second sub-input on the first control, the terminal device may further receive the third sub-input in which the user instructs the terminal device to exit the currently displayed first page, and then display the target page including the scroll bar control after the terminal device exits the first page.

For example, in this embodiment of the present disclosure, the third sub-input that is used to instruct the terminal device to exit the first page or the second page may be an input performed by the user on a key such as a return key or a Home key of the terminal device.

It may be understood that in the application identifier display method provided in this embodiment of the present disclosure, because the terminal device may provide the first page, the second page, and the like that are used to set the scroll bar control, the user can humanely set the scroll bar control as required.

In a possible implementation, after S302, the application identifier display method provided in this embodiment of the present disclosure may further include S303 and S304.

S303: The terminal device receives a second input performed by the user on the scroll bar control.

The second input may be a sliding input performed by the user on the scroll bar control (for example, a leftward sliding input or a rightward sliding input), and is specifically used to trigger the terminal device to scroll an application identifier in the scroll bar control.

In some embodiments, the terminal device may determine, based on input parameters such as an input track, an input pressure, an input direction, and an input distance that are of the second input, to switch application identifiers currently visible to the user in the scroll bar control to which other application identifiers visible to the user.

Figure 8A:
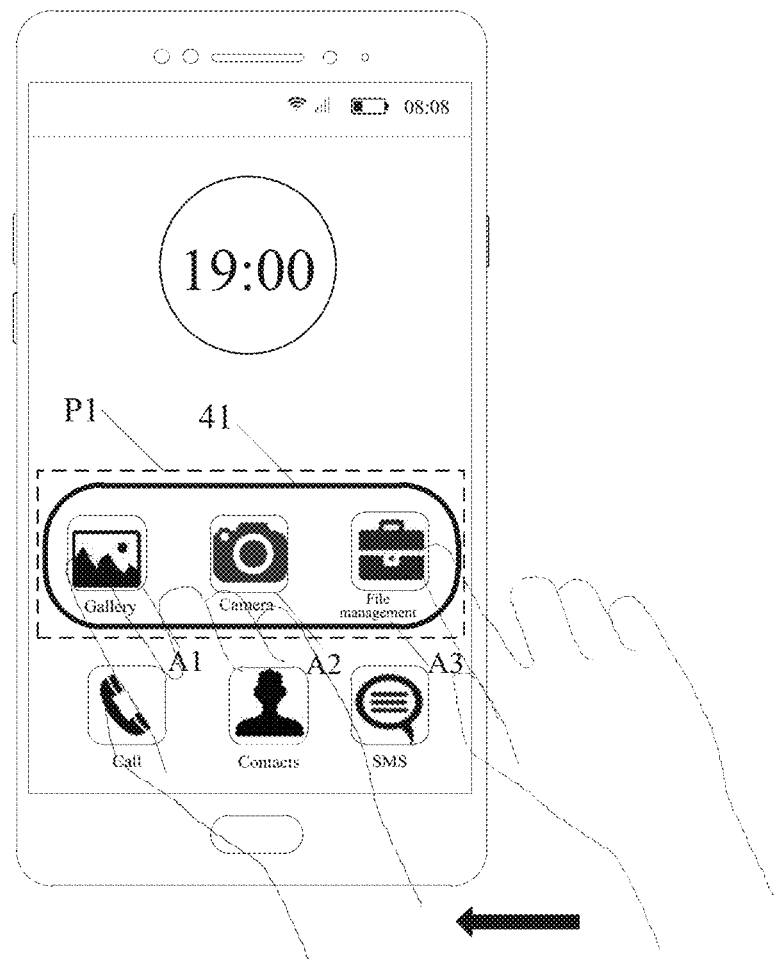
FIG. 8A is a tenth schematic diagram of a page displayed by a terminal device according to an embodiment of the present disclosure.

For example, with reference to FIGS. 4A and 4B, as shown in a page of the terminal device shown in FIG. 8A, the user performs a leftward sliding input (that is, the second input) on the scroll bar control 41. In this case, the currently displayed application identifiers in the scroll bar control 41 are the application identifier A1 to the application identifier A3, that is, P third application identifiers visible to the user are the application identifier A1 to the application identifier A3, where P is equal to 3.

S304: In response to the second input, the terminal device updates an application identifier displayed in the scroll bar control.

It may be understood that the terminal device may update all application identifiers or some application identifiers currently displayed in the scroll bar control. In addition, the terminal device may add an application identifier of a newly installed application program to the scroll bar control in real time, or the terminal device may delete an application identifier of an uninstalled application program from the scroll bar control in real time.

Optionally, S304 may be implemented by S304a.

S304a: In response to the second input, the terminal device updates P third application identifiers currently displayed in the scroll bar control to P fourth application identifiers.

The P third application identifiers are partly or completely different from the P fourth application identifiers, and P is a positive integer.

Figure 8B:
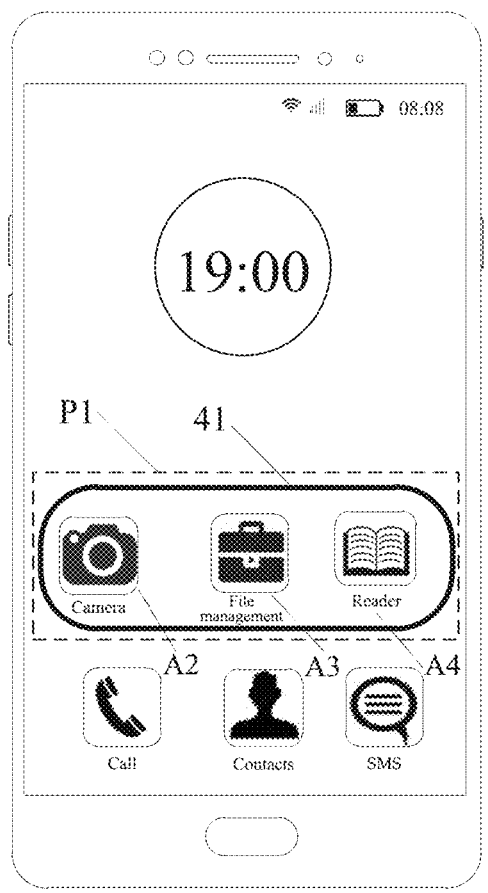
FIG. 8B is a eleventh schematic diagram of a page displayed by a terminal device according to an embodiment of the present disclosure.

For example, after receiving an input shown in FIG. 8A, the terminal device may display a page shown in FIG. 8B under trigger of the input. Application identifiers currently displayed in the scroll bar control 41 on the page are the application identifier A2 to the application identifier A4, that is, the P fourth application identifiers are the application identifier A2 to the application identifier A4.

It should be noted that in the application identifier display method provided in this embodiment of the present disclosure, the user may perform an input on the scroll bar control, to trigger the terminal device to scroll an application identifier in the scroll bar control for display, and further update the application identifier currently displayed in the scroll bar control. In this way, even if the scroll bar control includes more application identifiers, the user may perform an input on the scroll bar control to view all application identifiers in the scroll bar control.

In a possible implementation, after S302, the application identifier display method provided in this embodiment of the present disclosure may further include S305 and S306.

S305: The terminal device receives a third input performed by the user on the scroll bar control.

The third input is an input in which the user triggers the terminal device to move a location of the scroll bar control on the target page. For example, the terminal device may determine the position of the scroll bar control on the target page based on input parameters such as an input track, an input pressure, an input direction, and an input distance that are of the third input.

For example, the third input is a drag input performed by the user on the scroll bar control. With reference to FIG. 4A, as shown in FIG. 9A, the user performs an upward drag input (that is, the third input) on the scroll bar control, and the area P1 is the first area.

S306: In response to the third input, the terminal device updates an area in which the scroll bar control is located from a first area to a second area on the target page.

Figure 9A:
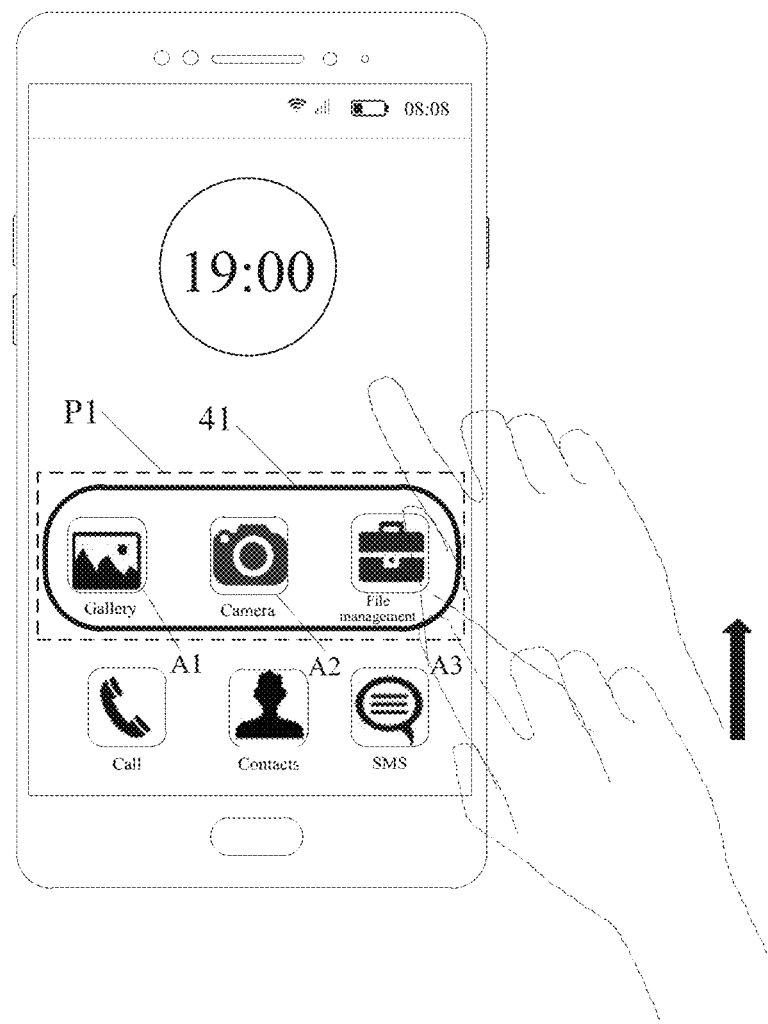
FIG. 9A is a twelfth schematic diagram of a page displayed by a terminal device according to an embodiment of the present disclosure.
Figure 9B:
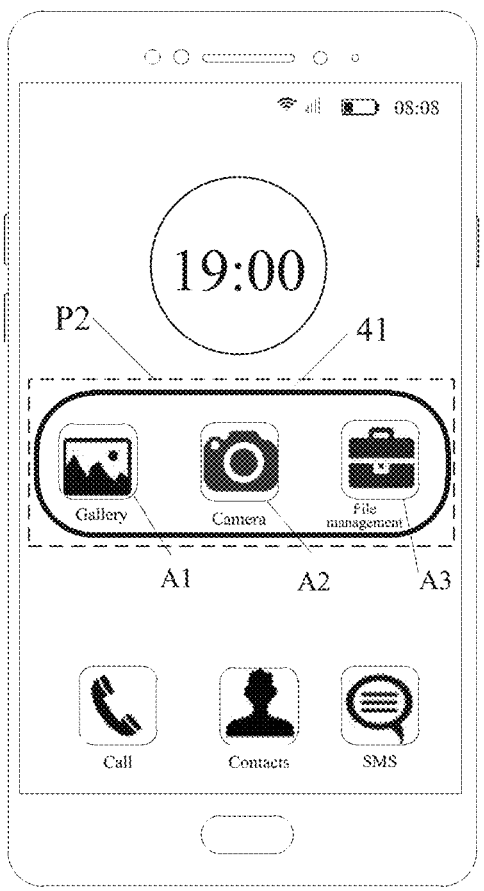
FIG. 9B is a thirteenth schematic diagram of a page displayed by a terminal device according to an embodiment of the present disclosure.

For example, after receiving an input shown in FIG. 9A, the terminal device may display a page shown in FIG. 9B. An area in which the scroll bar control 41 included in the page is located is an area P2 (that is, the second area) on the page.

It should be noted that in the application identifier display method provided in this embodiment of the present disclosure, the terminal device supports an input (for example, a drag input) on the scroll bar control by the user, to trigger the terminal device to update an area in which the scroll bar control is located on the target page. In this way, the scroll bar control may be moved to an area on the target page that meets a use habit of the user, thereby improving user experience of using the scroll bar control by the user.

Figure 10:
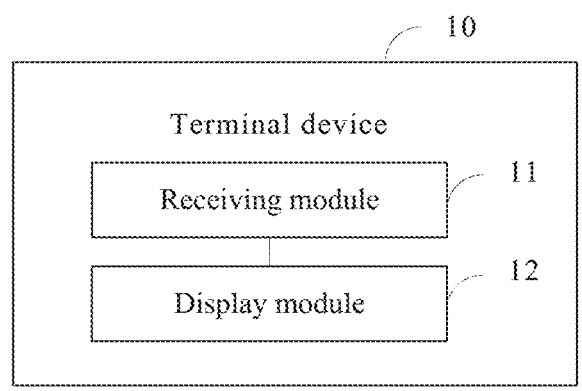
FIG. 10 is a possible schematic structural diagram of a terminal device according to an embodiment of the present disclosure.

As shown in FIG. 10, FIG. 10 is a possible schematic structural diagram of a terminal device according to an embodiment of the present disclosure. A terminal device 10 shown in FIG. 10 includes a receiving module 11 and a display module 12.

The receiving module 11 is configured to receive a first input performed by a user; and the display module 12 is configured to display a scroll bar control on a target page in response to the first input received by the receiving module 11, where the scroll bar control is used to display at least one of a first-type application identifier or a second-type application identifier, the target page is a page of a desktop of the terminal device, the first-type application identifier is an application identifier in a page of the desktop other than the target page, and the second-type application identifier is an application identifier of an area in which the scroll bar control is located on the target page before the scroll bar control is displayed.

Optionally, a first application identifier is displayed in a first position, a second application identifier is displayed in a second position, the first position and the second position are different positions in the scroll bar control, and the first position is a display position before the second position in the scroll bar control; and the first application identifier is an application identifier preset by the user in the scroll bar control, and the second application identifier is an application identifier in the scroll bar control other than the application identifier preset by the user.

Optionally, application identifiers in the scroll bar control are arranged based on a second display priority, and the second display priority is determined based on a use parameter of an application identifier in the scroll bar control; and the use parameter includes any one of the following: use duration of the application identifier and use frequency of the application identifier.

Optionally, the first input includes a first sub-input, a second sub-input, and a third sub-input; and the display module 12 may be configured to: display a first page in response to the first sub-input, where the first page includes a first control; execute a target action corresponding to the first control in response to the second sub-input performed on the first control; and display the scroll bar control on the target page in response to the third sub-input, where the target action includes at least one of the following: starting the scroll bar control, hiding a border of the scroll bar control, or adding an application identifier preset by the user to the scroll bar control.

Optionally, the receiving module 11 is further configured to: after the display module 12 displays the scroll bar control on the target page, receive a second input performed by the user on the scroll bar control; and the display module 12 is further configured to: in response to the second input received by the receiving module 11, update an application identifier displayed in the scroll bar control.

Optionally, the display module 12 may be configured to update P third application identifiers currently displayed in the scroll bar control to P fourth application identifiers, where P is a positive integer.

The terminal device 10 provided in this embodiment of the present disclosure can implement the processes implemented by the terminal device in the foregoing method embodiment. To avoid repetition, details are not described herein again.

According to a terminal device provided in this embodiment of the present disclosure, a scroll bar control may be displayed on a target page through a first input performed by a user, where the scroll bar control is used to display at least one of a first-type application identifier or a second-type application identifier, the target page is a page of a desktop of the terminal device, the first-type application identifier is an application identifier in a page of the desktop other than the target page, and the second-type application identifier is an application identifier of an area in which the scroll bar control is located on the target page before the scroll bar control is displayed. Based on this solution, because the scroll bar control displayed on the target page by the terminal device may include a first-type application identifier, the user may operate an application identifier in a page of the desktop other than the target page in the scroll bar control displayed on the target page, without controlling the terminal device to jump to a page of the desktop other than the target page. In addition, the scroll bar control may include a second-type application identifier. Therefore, even if the scroll bar control displayed by the terminal device shields some application identifiers that are originally displayed on the target page, the terminal device may subsequently provide these application identifiers for the user by using the scroll bar control. In this way, the user can operate, on the target page, all application identifiers provided by the terminal device, thereby simplifying an operation performed by the user on application identifiers included in different pages in the desktop of the terminal device, and improving convenience of operating, by the user, the application identifiers provided by the terminal device. In addition, because the terminal device displays the first-type application identifier on the target page by using the scroll bar control, instead of directly displaying the first-type application identifier on the target page, application identifiers displayed on the target page by the terminal device are relatively concise and aesthetic.

Figure 11:
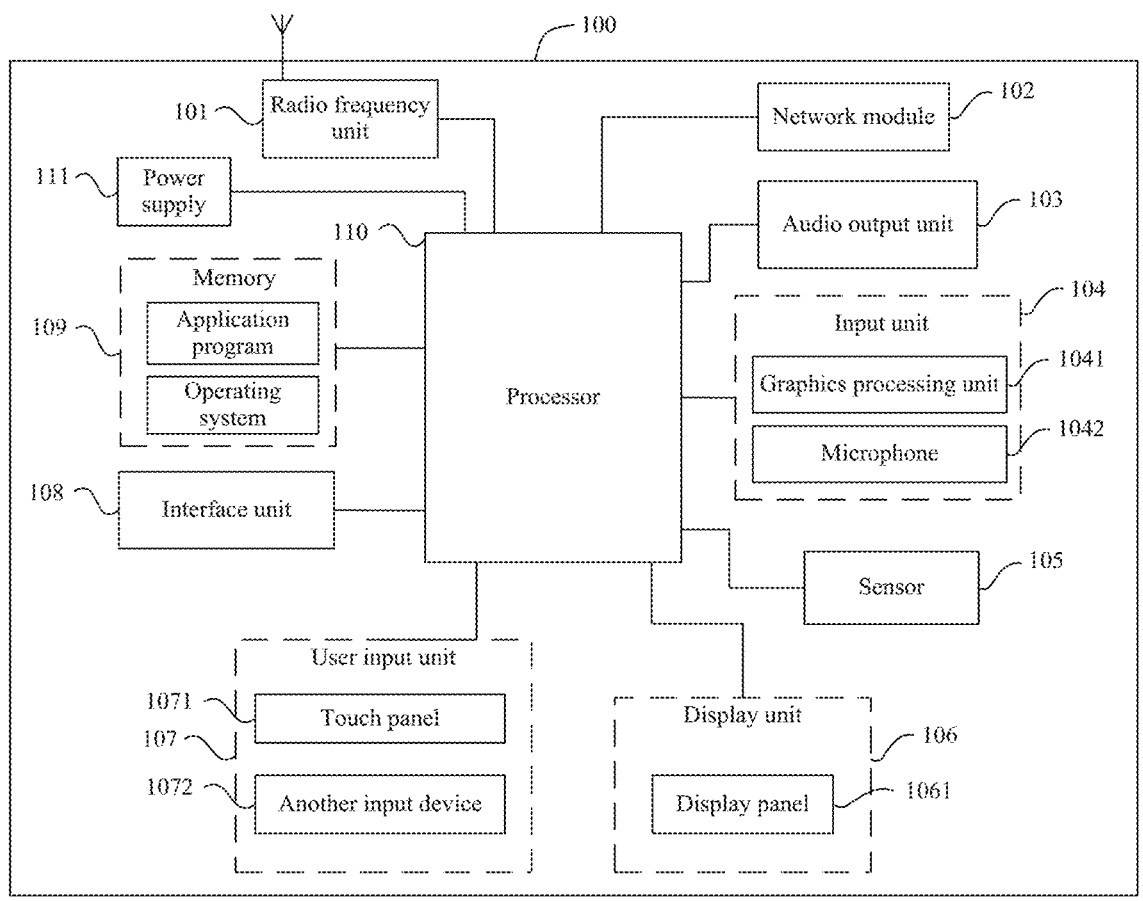
FIG. 11 is a schematic diagram of a hardware structure of a terminal device according to an embodiment of the present disclosure.

FIG. 11 is a schematic diagram of a hardware structure of a terminal device according to an embodiment of the present disclosure. A terminal device 100 includes but is not limited to components such as a radio frequency unit 101, a network module 102, an audio output unit 103, an input unit 104, a sensor 105, a display unit 106, a user input unit 107, an interface unit 108, a memory 109, a processor 110, and a power supply 111. It can be understood by a person skilled in the art that, the terminal device structure shown in FIG. 11 does not constitute any limitation on the terminal device, and the terminal device may include more or fewer components than those shown in the figure, or combine some components, or have different component arrangements. In this embodiment of the present disclosure, the terminal device includes but is not limited to a mobile phone, a tablet computer, a notebook computer, a palmtop computer, an in-vehicle terminal, a wearable device, a pedometer, and the like.

The user input unit 107 is configured to receive a first input performed by a user; and the display unit 106 is configured to display a scroll bar control on a target page in response to the first input received by the user input unit 107, where the scroll bar control is used to display at least one of a first-type application identifier or a second-type application identifier, the target page is a page of a desktop of the terminal device, the first-type application identifier is an application identifier in a page of the desktop other than the target page, and the second-type application identifier is an application identifier of an area in which the scroll bar control is located on the target page before the scroll bar control is displayed.

According to a terminal device provided in this embodiment of the present disclosure, a scroll bar control may be displayed on a target page through a first input performed by a user, where the scroll bar control is used to display at least one of a first-type application identifier or a second-type application identifier, the target page is a page of a desktop of the terminal device, the first-type application identifier is an application identifier in a page of the desktop other than the target page, and the second-type application identifier is an application identifier of an area in which the scroll bar control is located on the target page before the scroll bar control is displayed. Based on this solution, because the scroll bar control displayed on the target page by the terminal device may include a first-type application identifier, the user may operate an application identifier in a page of the desktop other than the target page in the scroll bar control displayed on the target page, without controlling the terminal device to jump to a page of the desktop other than the target page. In addition, the scroll bar control may include a second-type application identifier. Therefore, even if the scroll bar control displayed by the terminal device shields some application identifiers that are originally displayed on the target page, the terminal device may subsequently provide these application identifiers for the user by using the scroll bar control. In this way, the user can operate, on the target page, all application identifiers provided by the terminal device, thereby simplifying an operation performed by the user on application identifiers included in different pages in the desktop of the terminal device, and improving convenience of operating, by the user, the application identifiers provided by the terminal device. In addition, because the terminal device displays the first-type application identifier on the target page by using the scroll bar control, instead of directly displaying the first-type application identifier on the target page, application identifiers displayed on the target page by the terminal device are relatively concise and aesthetic.

It should be understood that, in this embodiment of the present disclosure, the radio frequency unit 101 may be configured to receive and send information or a signal in a call process. For example, after receiving downlink data from a base station, the radio frequency unit 101 sends the downlink data to the processor 110 for processing. In addition, the radio frequency unit 101 sends uplink data to the base station. Generally, the radio frequency unit 101 includes, but not limited to, an antenna, at least one amplifier, a transceiver, a coupler, a low noise amplifier, and a duplexer, and the like. In addition, the radio frequency unit 101 may communicate with a network and another device through a wireless communication system.

The terminal device provides wireless broadband Internet access for the user by using the network module 102, for example, helping the user send and receive an e-mail, browse a web page, and access streaming media.

The audio output unit 103 can convert audio data received by the radio frequency unit 101 or the network module 102 or stored in the memory 109 into an audio signal, and output the audio signal as sound. In addition, the audio output unit 103 may further provide an audio output (for example, a call signal received voice, or a message received voice) related to a specific function implemented by the terminal device 100. The audio output unit 103 includes a speaker, a buzzer, a telephone receiver, and the like.

The input unit 104 is configured to receive an audio signal or a video signal. The input unit 104 may include a graphics processing unit (GPU) 1041 and a microphone 1042. The graphics processing unit 1041 processes image data of a static picture or a video obtained by an image capturing apparatus (for example, a camera) in a video capturing mode or an image capturing mode. A processed image frame may be displayed on the display unit 106. The image frame processed by the graphics processor 1041 may be stored in the memory 109 (or another storage medium) or sent by using the radio frequency unit 101 or the network module 102. The microphone 1042 may receive sound and may process such sound into audio data. The processed audio data may be converted, in a call mode, into a format that may be sent to a mobile communication base station by using the radio frequency unit 101 for output.

The terminal device 100 further includes at least one sensor 105, such as an optical sensor, a motion sensor, and another sensor. For example, the optical sensor includes an ambient light sensor and a proximity sensor. The ambient light sensor may adjust luminance of the display panel 1061 based on brightness of ambient light. The proximity sensor may turn off the display panel 1061 and/or backlight when the terminal device 100 moves to an ear. As a type of the motion sensor, an accelerometer sensor may detect an acceleration value in each direction (generally, three axes), and detect a value and a direction of gravity when the accelerometer sensor is static, and may be used in an application for recognizing a posture of the terminal device (such as screen switching between landscape and portrait modes, a related game, or magnetometer posture calibration), a function related to vibration recognition (such as a pedometer or a knock), and the like. The sensor 105 may further include a fingerprint sensor, a pressure sensor, an iris sensor, a molecular sensor, a gyroscope, a barometer, a hygrometer, a thermometer, an infrared sensor, and the like. Details are not described herein.

The display unit 106 is configured to display information inputted by a user or information provided to a user. The display unit 106 may include a display panel 1061. The display panel 1061 may be configured in a form of a liquid crystal display (LCD), an organic light-emitting diode (OLED), or the like.

The user input unit 107 may be configured to receive input digit or character information, and generate a key signal input related to a user setting and function control of the terminal device. For example, the user input unit 107 includes a touch panel 1071 and another input device 1072. The touch panel 1071 is also referred to as a touchscreen, and may collect a touch operation performed by a user on or near the touch panel 1071 (such as an operation performed by a user on the touch panel 1071 or near the touch panel 1071 by using any proper object or accessory, such as a finger or a stylus). The touch panel 1071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to a processor 110, and receives and executes a command sent by the processor 110. In addition, the touch panel 1071 may be of a resistive type, a capacitive type, an infrared type, a surface acoustic wave type, or the like. In addition to the touch panel 1071, the user input unit 107 may further include the another input device 1072. For example, the another input device 1072 may include but is not limited to a physical keyboard, a functional button (such as a volume control button or a power on/off button), a trackball, a mouse, and a joystick. Details are not described herein.

The touch panel 1071 may cover the display panel 1061. When detecting the touch operation on or near the touch panel 1071, the touch panel 1071 transmits the touch operation to the processor 110 to determine a type of a touch event, and then the processor 110 provides corresponding visual output on the display panel 1061 based on the type of the touch event. Although in FIG. 11, the touch panel 1071 and the display panel 1061 are configured as two independent components to implement input and output functions of the terminal device, in some embodiments, the touch panel 1071 and the display panel 1061 can be integrated to implement the input and output functions of the terminal device. This is not specifically herein.

The interface unit 108 is an interface for connecting an external apparatus to the terminal device 100. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, an earphone port, and the like. The interface unit 108 may be configured to receive an input (for example, data information or power) from an external apparatus and transmit the received input to one or more elements in the terminal device 100, or transmit data between the terminal device 100 and the external apparatus.

The memory 109 may be configured to store a software program and various data. The memory 109 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 109 may include a high-speed random access memory, or may include a nonvolatile memory, for example, at least one disk storage device, a flash memory, or another volatile solid-state storage device.

The processor 110 is a control center of the terminal device, connects various parts of the entire terminal device by using various interfaces and circuits, and performs various functions of the terminal device and processes data by running or executing the software programs and/or the modules stored in the memory 109 and invoking data stored in the memory 109, so as to monitor the terminal device as a whole. The processor 110 may include one or more processing units. Optionally, an application processor and a modem processor may be integrated into the processor 110. The application processor mainly processes an operating system, a user interface, an application program, and the like. The modem processor mainly processes wireless communications. It may be understood that, alternatively, the modem processor may not be integrated into the processor 110.

The terminal device 100 may further include a power supply 111 (for example, a battery) that supplies power to various components. Optionally, the power supply 111 may be logically connected to the processor 110 by using a power supply management system, to perform functions of managing charging, discharging, and power consumption by using the power supply management system.

In addition, the terminal device 100 includes some function modules not shown. Details are not described herein.

Optionally, an embodiment of the present disclosure further provides a terminal device, including a processor 110, a memory 109, and a computer program that is stored in the memory 109 and executable on the processor 110. When the computer program is executed by the processor 110, the processes of the foregoing method embodiment are implemented and a same technical effect can be achieved. To avoid repetition, details are not described herein again.

The embodiments of the present disclosure further provide a non-transitory computer-readable storage medium. The non-transitory computer-readable storage medium stores a computer program, and when a processor executes the computer program, the processes of the foregoing method embodiment are implemented and the same technical effect can be achieved. To avoid repetition, details are not described herein again. The non-transitory computer-readable storage medium may be a read-only memory (ROM), a random access memory (RAM), a magnetic disk, a compact disc, or the like.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more limitations, an element defined by "including a . . . " does not preclude the existence of other identical elements in the process, method, article, or device that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal device (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the above specific implementations, and the above specific implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

What is claimed is:

1. An application identifier display method, applied to a terminal device and comprising:
   receiving a first input on any page of a desktop of the terminal device performed by a user, wherein the first input comprises a first sub-input, a second sub-input, and a third sub-input;
   displaying a first page in response to the first sub-input, wherein the first page comprises a first control;
   executing a target action corresponding to the first control in response to the second sub-input performed on the first control; and
   displaying a scroll bar control on a target page in response to the third sub-input, wherein the scroll bar control is used to display a first-type application identifier, or the scroll bar control is used to display a first-type application identifier and a second-type application identifier, wherein the target page is a page of a desktop of the terminal device, the first-type application identifier is an application identifier in a page of the desktop other than the target page, and the second-type application identifier is an application identifier of an area in which the scroll bar control is located on the target page before the scroll bar control is displayed; wherein the target action comprises at least one of starting the scroll bar control, hiding a border of the scroll bar control, or adding an application identifier preset by the user to the scroll bar control.

2. The method according to claim 1, wherein
   a first application identifier is displayed in a first position, a second application identifier is displayed in a second position, the first position and the second position are different positions in the scroll bar control, and the first position is a display position before the second position in the scroll bar control; and
   the first application identifier is an application identifier preset by the user in the scroll bar control, and the second application identifier is an application identifier in the scroll bar control other than the application identifier preset by the user.

3. The method according to claim 1, wherein
   application identifiers in the scroll bar control are arranged based on a target display priority, and the target display priority is determined based on a use parameter of an application identifier in the scroll bar control; and
   the use parameter comprises any one of following: use duration of the application identifier and use frequency of the application identifier.

4. The method according to claim 1, wherein after the displaying a scroll bar control on a target page, the method further comprises:
   receiving a second input performed by the user on the scroll bar control; and in response to the second input, updating an application identifier displayed in the scroll bar control.

5. The method according to claim 4, wherein the updating an application identifier displayed in the scroll bar control comprises:
updating P third application identifiers currently displayed in the scroll bar control to P fourth application identifiers, wherein P is a positive integer.

6. The method according to claim 1, wherein a border of the scroll bar control is displayed on the target page of the terminal device based on a first transparency.

7. A terminal device, comprising a processor, a memory, and a computer program that is stored in the memory and executable on the processor, wherein the computer program, when executed by the processor, causes the terminal device to perform:
receiving a first input on any page of a desktop of the terminal device performed by a user, wherein the first input comprises a first sub-input, a second sub-input, and a third sub-input;
displaying a first page in response to the first sub-input, wherein the first page comprises a first control;
executing a target action corresponding to the first control in response to the second sub-input performed on the first control; and
displaying a scroll bar control on a target page in response to the third sub-input, wherein the scroll bar control is used to display a first-type application identifier, or the scroll bar control is used to display a first-type application identifier and a second-type application identifier, wherein the target page is a page of a desktop of the terminal device, the first-type application identifier is an application identifier in a page of the desktop other than the target page, and the second-type application identifier is an application identifier of an area in which the scroll bar control is located on the target page before the scroll bar control is displayed; wherein the target action comprises at least one of starting the scroll bar control, hiding a border of the scroll bar control, or adding an application identifier preset by the user to the scroll bar control.

8. The terminal device according to claim 7, wherein
a first application identifier is displayed in a first position, a second application identifier is displayed in a second position, the first position and the second position are different positions in the scroll bar control, and the first position is a display position before the second position in the scroll bar control; and
the first application identifier is an application identifier preset by the user in the scroll bar control, and the second application identifier is an application identifier in the scroll bar control other than the application identifier preset by the user.

9. The terminal device according to claim 7, wherein
application identifiers in the scroll bar control are arranged based on a target display priority, and the target display priority is determined based on a use parameter of an application identifier in the scroll bar control; and
the use parameter comprises any one of following: use duration of the application identifier and use frequency of the application identifier.

10. The terminal device according to claim 7, wherein the computer program, when executed by the processor, causes the terminal device to further perform:
receiving a second input performed by the user on the scroll bar control; and
in response to the second input, updating an application identifier displayed in the scroll bar control.

11. The terminal device according to claim 10, wherein the computer program, when executed by the processor, causes the terminal device to perform:
updating P third application identifiers currently displayed in the scroll bar control to P fourth application identifiers, wherein P is a positive integer.

12. The terminal device according to claim 7, wherein a border of the scroll bar control is displayed on the target page of the terminal device based on a first transparency.

13. A non-transitory computer-readable storage medium, wherein the non-transitory computer-readable storage medium stores a computer program, and the computer program, when executed by a processor of a terminal device, causes the terminal device to perform:
receiving a first input on any page of a desktop of the terminal device performed by a user, wherein the first input comprises a first sub-input, a second sub-input, and a third sub-input;
displaying a first page in response to the first sub-input, wherein the first page comprises a first control;
executing a target action corresponding to the first control in response to the second sub-input performed on the first control; and
displaying a scroll bar control on a target page in response to the third sub-input, wherein the scroll bar control is used to display a first-type application identifier, or the scroll bar control is used to display a first-type application identifier and a second-type application identifier, wherein the target page is a page of a desktop of the terminal device, the first-type application identifier is an application identifier in a page of the desktop other than the target page, and the second-type application identifier is an application identifier of an area in which the scroll bar control is located on the target page before the scroll bar control is displayed; wherein the target action comprises at least one of starting the scroll bar control, hiding a border of the scroll bar control, or adding an application identifier preset by the user to the scroll bar control.

14. The non-transitory computer-readable storage medium according to claim 13, wherein
a first application identifier is displayed in a first position, a second application identifier is displayed in a second position, the first position and the second position are different positions in the scroll bar control, and the first position is a display position before the second position in the scroll bar control; and
the first application identifier is an application identifier preset by the user in the scroll bar control, and the second application identifier is an application identifier in the scroll bar control other than the application identifier preset by the user.

15. The non-transitory computer-readable storage medium according to claim 13, wherein
application identifiers in the scroll bar control are arranged based on a target display priority, and the target display priority is determined based on a use parameter of an application identifier in the scroll bar control; and
the use parameter comprises any one of following: use duration of the application identifier and use frequency of the application identifier.

16. The non-transitory computer-readable storage medium according to claim 13, wherein the computer program, when executed by the processor, causes the terminal device to further perform:
   receiving a second input performed by the user on the scroll bar control; and
   in response to the second input, updating an application identifier displayed in the scroll bar control.

17. The non-transitory computer-readable storage medium according to claim 16, wherein the computer program, when executed by the processor, causes the terminal device to perform:
   updating P third application identifiers currently displayed in the scroll bar control to P fourth application identifiers, wherein P is a positive integer.

* * * * *